United States Patent [19]
Campbell

[11] Patent Number: 5,648,937
[45] Date of Patent: Jul. 15, 1997

[54] METHOD AND APPARATUS FOR CORRELATING GEOLOGICAL STRUCTURE HORIZONS FROM VELOCITY DATA TO WELL OBSERVATIONS

[75] Inventor: Bruce S. Campbell, Plano, Tex.

[73] Assignee: Atlantic Richfield Company, Los Angeles, Calif.

[21] Appl. No.: 375,553

[22] Filed: Jan. 18, 1995

[51] Int. Cl.$^6$ .................. G01V 1/36; G01V 1/40
[52] U.S. Cl. .................. 367/27; 367/38; 367/51; 367/59; 364/421; 364/422
[58] Field of Search .................. 367/27, 38, 51, 367/59, 57; 364/421, 422

[56] References Cited

U.S. PATENT DOCUMENTS

| | | | |
|---|---|---|---|
| 4,573,148 | 2/1986 | Herkenhoff et al. | 367/59 |
| 4,688,198 | 8/1987 | Wiggins | 364/421 |
| 4,991,095 | 2/1991 | Swenson | 364/421 |
| 5,128,866 | 7/1992 | Weakley | 364/422 |

*Primary Examiner*—Nelson Moskowitz
*Attorney, Agent, or Firm*—Anderson, Levine & Lintel

[57] ABSTRACT

A method and apparatus for adjusting the results of a seismic survey according to well log data obtained from wells within the survey region is disclosed. The disclosed method operates on one seismic horizon at a time, and first applies well log data, arranged by location of the wells in the survey region, to the seismic survey. Deviation values are calculated for each well location, as a signed difference between the actual depth data for the geological interface and a deduced horizon depth from the seismic survey. A difference function is evaluated for each survey point to be adjusted in the survey region (ranging from a single point to all survey points), preferably as a weighted average of the deviations at the wells, where the weighting is inversely related to the distance of the well from the survey point under adjustment. An error value can also be derived, by adjusting the survey region for all wells but one under analysis, deriving an adjusted horizon depth for the well under analysis, and comparing the adjusted horizon depth to the well log interface depth; deriving such error values for all wells in the survey allows a root-mean-square error or other statistic to be generated.

24 Claims, 3 Drawing Sheets

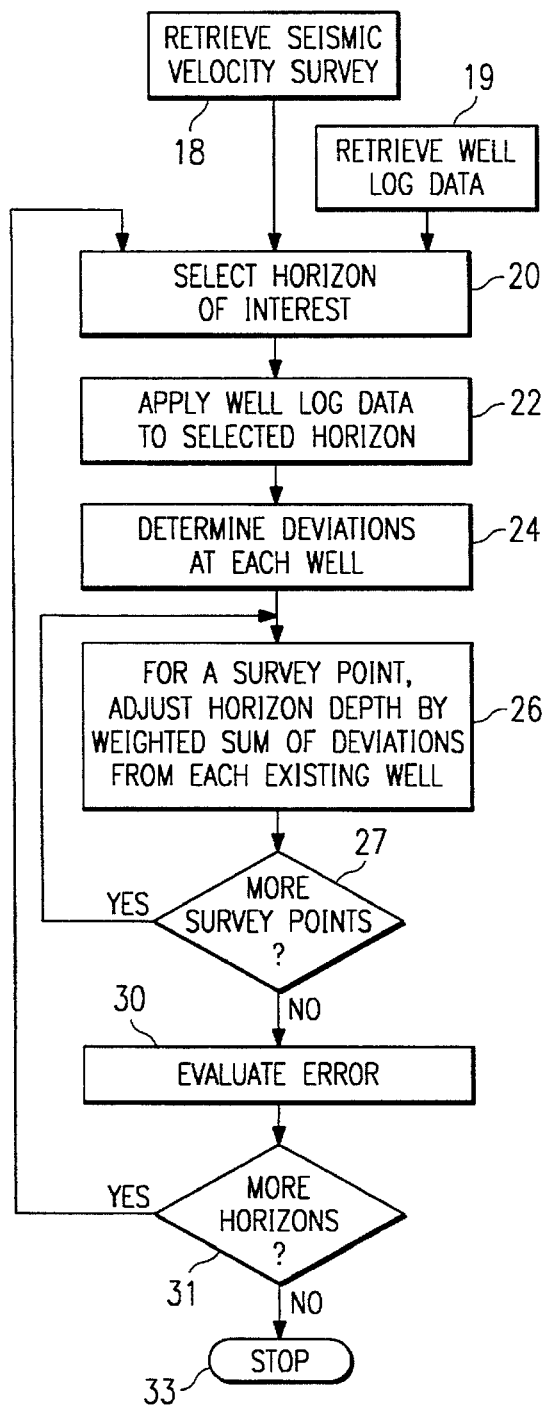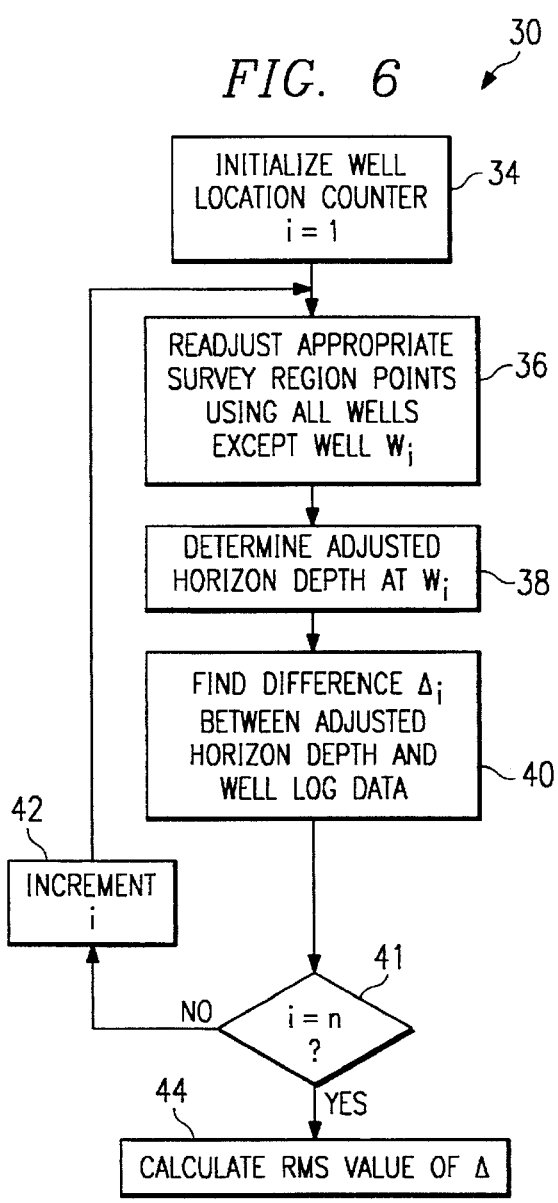

METHOD AND APPARATUS FOR CORRELATING GEOLOGICAL STRUCTURE HORIZONS FROM VELOCITY DATA TO WELL OBSERVATIONS

This invention is in the field of geological exploration, and is more particularly directed to correlating seismic survey data to observations made at well locations.

BACKGROUND OF THE INVENTION

As is well known, modern prospecting for hydrocarbons (i.e., oil and gas) commonly utilizes geological surveys to identify the location and depth of subsurface geological structures, based upon which the size and location of hydrocarbon reserves can be estimated. Common survey techniques involve the well-known seismic survey, in which acoustic energy is imparted into the earth and, after reflection or refraction by geological structures and their interfaces, is detected at multiple locations of the earth. The time delay between the impartation of the source energy and the detection of the reflected or refracted energy (i.e., the travel time) is used to estimate the depth of the geological structure from the surface. Of course, accurate conversion of travel time data into depth data requires accurate estimation of the acoustic velocity of the sub-surface strata.

As is well known in the art, so-called "process" velocities may be deduced from seismic survey data by way of certain well known techniques. Two such well known techniques are the constant velocity gather (CVG) and the constant velocity stack (CVS). The CVG and CVS processes each perform normal move-out ("NMO") for a set of 2-D seismic data over iterations of an assumed constant velocity; the closest stack velocity to the actual velocity is presumed to be that which results in the most realistic reflection artifact. Another well-known process velocity is the dip move-out ("DMO") velocity, which is used to correct for the angle of dip of a sub-surface reflector. Conventional migration techniques also produce a migration velocity, which is another type of process velocity, which is based upon the assumed location of equal velocity lines below the surface and above the reflector being migrated. According to each of these techniques, a seismic velocity survey may thus be readily generated from seismic data, providing excellent coverage of a relatively large survey region. The velocity survey is thus able to identify the depth of geological interfaces, based on the detected reflections of the acoustic energy and based upon the estimated acoustic velocity.

Each of these process velocities, as well as those obtained from core sampling and logging, are used to estimate interval velocities for a number of surface locations using the well-known Dix equation. While this approach results in a calculated interval velocity, both the process velocity values and the Dix equation itself are based upon assumptions about the sub-surface geology. These assumptions may not be valid for the actual survey volume, however, due to differences between the assumptions and the actual geology which manifest themselves as anomalies or artifacts in the interval velocity model for the survey. Examples of physical causes of these artifacts include those well-known problems due to near-surface layers, such as permafrost; near-surface layers of high velocity and significant thickness variation can especially causes problems in the stacking of seismic data.

Furthermore, considering that process velocity values are generally optimized to provide the best image of a reflector in the seismic data rather than the most accurate representation of the actual acoustic velocity in the earth, use of process velocities in performing time-to-depth conversion of seismic data is vulnerable to error.

Still furthermore, inaccuracy in the seismic velocity determination also results from the velocity anisotropy of the earth, such that the acoustic velocity in a direction normal to the surface of the earth differs from the acoustic velocity in a direction parallel to the surface of the earth. The CVG and CVS techniques are thus known to introduce inaccuracy in the determination of acoustic velocities.

As is also known in the art, the most accurate depth determinations may be made by way of well logging, in which direct measurements are taken from within a wellbore. The depths of interfaces between geological structures may be accurately determined from the well log, for example by measuring the depths at which discontinuities in the logged acoustic velocity occur. However, deviations are often present between the actual interface depths as indicated by well log measurements, on one hand, and the estimated depth of such interfaces deduced from a seismic velocity survey, on the other hand.

While well log measurements are of higher accuracy that depth profiles from seismic surveys, well log measurements are of course spatially limited to the location of the wellbore, and can provide no information at any significant distance away from existing wells. Therefore, much reliance is placed upon seismic surveys to identify productive locations at which new wells may be drilled; however, as noted above, deviations in the calculated and actual velocities and depths limit the accuracy of such seismic surveys.

It is therefore an object of the present invention to provide a method and apparatus for adjusting seismic velocity depth surveys to fit actual measurements taken at existing well locations.

It is another object of the present invention to provide such a method and apparatus which can perform such adjustments in an automated manner.

It is another object of the present invention to provide such a method and apparatus that can also determine the extent of error in the seismic survey following the adjustment.

Other objects and advantages of the present invention will be appreciated by those of ordinary skill in the art having reference to the following specification together with the drawings.

SUMMARY OF THE INVENTION

The present invention may be implemented into a computer system and method that ties time domain seismic velocity-based survey data to well log measurements. The time domain seismic velocity survey data generally corresponds to multiple horizons in the survey; for each seismic horizon, the seismic velocity survey generally includes a plurality of lines indicating the depth of the horizon at various discrete points along each line. The well log data include interface depth measurements from multiple wells in the survey area. For a selected seismic horizon, the difference between the measured interface depth from the well log and the depth of the horizon deduced from the seismic survey is identified for each well location. For each point of interest in the seismic velocity survey, the horizon depth is adjusted according to a weighted difference function from each of the wells in the survey; preferably, the difference function is weighted according to the inverse square of the distance from a particular well to the point of interest. This process may be repeated to adjust all of the points in the seismic survey to correspond to the well log data.

According to another aspect of the present invention, an error value may be determined by performing the adjustment calculation for the adjusted seismic survey at each well location, ignoring the well log data thereat. The result of this adjustment is then compared against the well log data at the well location to measure the error in the process. A root-mean-square error value, or other statistic, may then be readily calculated by performing the error calculation at each of the well locations of interest.

BRIEF DESCRIPTION OF THE DRAWINGS

FIG. 3 is a flow chart illustrating the operation of the preferred embodiment of the invention.

FIG. 6 is a flow chart illustrating the operation of error evaluation according to the preferred embodiment of the invention.

DETAILED DESCRIPTION OF THE PREFERRED EMBODIMENT

Figure 1:
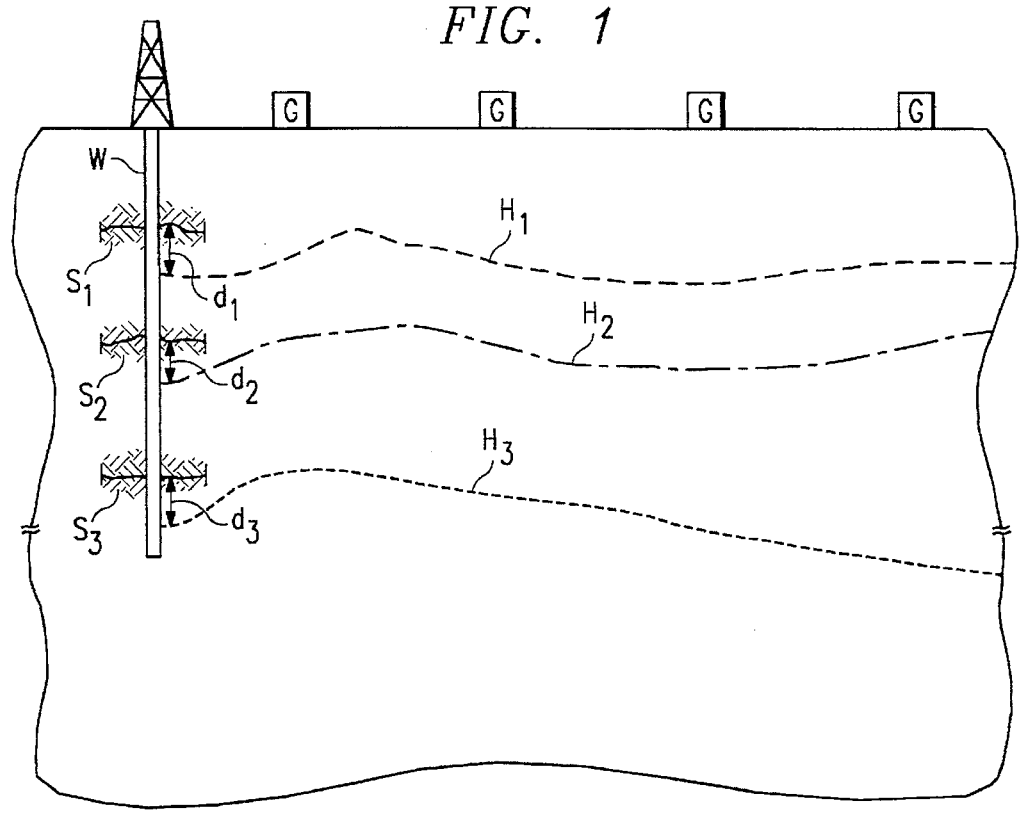
FIG. 1 is a schematic diagram of a cross-section of the earth, illustrating the presence of deviations between velocity survey horizon and actual geological interface depths as noted at well locations.

FIG. 1 illustrates a cross-section of the earth at which both a seismic survey has been performed, and in which an existing oil well has been drilled. As shown in FIG. 1, a plurality of geophones G have been placed at the surface, for recording reflected acoustic energy that is imparted into the earth from a conventional source (not shown).

Based on the recorded reflected acoustic energy and using conventional data processing techniques, a seismic survey is produced indicating the presence of multiple horizons $H_1$, $H_2$, $H_3$. These seismic horizons H correspond to estimates of the depth of geological interfaces in the survey region. It is contemplated that the seismic survey will be based upon estimations of the velocities of sub-surface strata, which may be obtained from conventional techniques such as the constant velocity gather (CVG) and the constant velocity stack (CVS), as noted hereinabove. It is also preferable to edit the seismic velocity survey to remove the effects of measurement anomalies, as described in copending application Ser. No. 08/085,440 entitled "Method of Determining 3-D Acoustic Velocities for Seismic Surveys", filed Jun. 30, 1993, now U.S. Pat. No. 5,513,150, issued Apr. 30, 1996, assigned to Atlantic Richfield Company, and incorporated herein by this reference.

As illustrated in FIG. 1, an existing wellbore W is also present in this exemplary survey region. As is conventional in the art, well logging is performed at wellbore W to measure the actual depth of geological interfaces at that location. In FIG. 1, such measured interfaces $S_1$, $S_2$, $S_3$ are illustrated near wellbore W; as is also well known in the art, and as suggested in FIG. 1, well log measurements are only valid at locations surrounding and very near to wellbore W.

It is not uncommon for substantial deviations to be present between the estimated depth of horizons H based on the seismic velocity survey, on the one hand, and the measured depth of interfaces S as determined from well log measurements, on the other hand. In FIG. 1, deviations $d_1$, $d_2$, $d_3$ are present at wellbore W between the observed interfaces $S_1$, $S_2$, $S_3$ and the seismic horizons $H_1$, $H_2$, $H_3$, respectively. These deviations call into question the results of the seismic survey; however, since the well log data are not accurate away from wellbore W, the seismic survey results must be used in the selection of new drilling sites. According to the preferred embodiment of the present invention, a method is provided for adjusting the depth of horizons H to more closely match the well log interface depth observations.

In addition, as will be apparent from the following description, most survey regions of interest will have multiple existing wells thereat, with each existing well having been logged to provide interface depth measurements therefor. The preferred embodiment of the present invention described hereinbelow contemplates such multiple wells.

Figure 2:
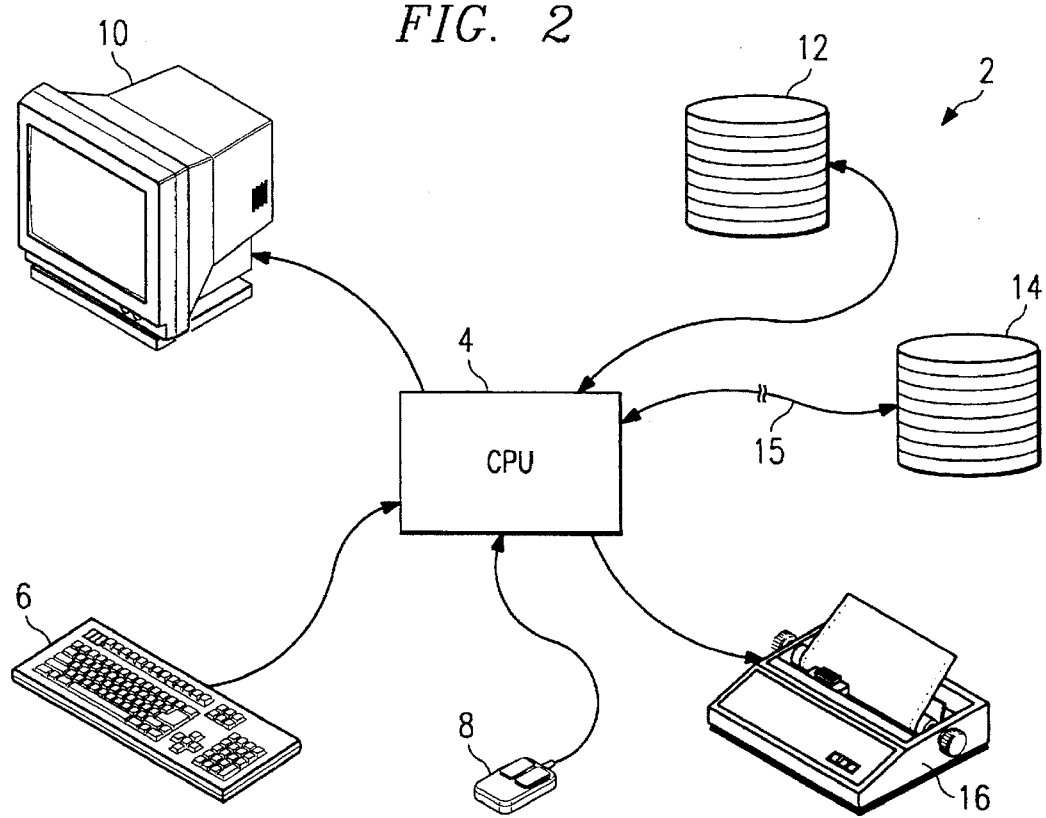
FIG. 2 is a schematic diagram of a computer system incorporating the preferred embodiment of the invention.

Referring now to FIG. 2, an overview of computer system 2 capable of performing the preferred embodiment of the present invention will be briefly described. It is contemplated that computer system 2 will have computing power and speed on the order of modern desktop workstations, such as the SYSTEM EXPANSION workstation available from Digital Equipment Corporation, the SPARCSTATION workstation available from Sun Microsystems, Inc., and the R6000 workstation available from IBM Corporation.

Computer system 2, as is conventional in the art for workstations, includes CPU 4 which performs the data processing operations described hereinbelow. CPU 4 interfaces with a human analyst or user via conventional input/output devices, such as keyboard 6, mouse 8, graphics display 10, and printer 12. For best resolution and results, it is preferred that graphics display 10 be of the type having high resolution color display. Printer 16 is, of course, a conventional printer capable of printing black-and-white or full color output, as may be desired.

Computer system 2 also preferably includes local disk storage 12 for the storage of program and data information, and also preferably can access remote disk storage 14 by way of a local-area or wide-area network 15, in the conventional manner. Disk storage 12, 14, according to this embodiment of the invention, contain well log information obtained from existing wells in the survey region of interest, and also seismic velocity survey data for the region of interest, as discussed hereinabove.

For ease of display and editing, it is preferred that computer system 2 operate in a windowing environment, enabling the human analyst to open various "windows" for display during the operation of the system. In addition, as is well known in the art, it is preferred that data entry and other file management operations be performed by way of pull-down menus, radio buttons, and other similar features common to windowing environments.

It is contemplated that one of ordinary skill in the art will be capable of programming such a digital computer in the appropriate manner to perform the functions described hereinbelow without undue experimentation. It is preferred that such programming be done in a high-level language, such as C, and then compiled for installation on the workstations for the various users of this method, as is conventional in the art.

Referring now to FIG. 3, the method of operating computer system 2 to adjust seismic survey results according to the preferred embodiment of the invention will now be described in detail. This embodiment of the invention is initiated by processes 18 and 19 which retrieve seismic velocity survey data and well log data, respectively, from disk storage 12, 14, as the case may be. The data retrieved in process 18 includes seismic survey data that at least covers the survey region of interest, preferably based upon velocity data edited according to the method described in the above-incorporated U.S. Pat. No. 5,513,150. The well log data retrieved in process 19 will, of course, correspond to the existing wells in the survey region of interest.

According to this embodiment of the invention, it is contemplated that the seismic survey data retrieved in process 18 will correspond to a plurality of time horizons for a plurality of seismic "shot" lines across the region. The example of FIG. 1 shows illustrates data for a single shot line that corresponds to a plurality of horizons; each horizon, of course, corresponds to a sub-surface reflector of acoustic energy.

After retrieval of the data in processes 18, 19, process 20 is next performed by way of which one of the multiple horizons is selected for use in the adjusting method of the present invention. As will be apparent from the following description, the method of this embodiment of the invention operates on a single horizon at a time to adjust the seismic survey depths for that horizon according to the well log data. As such, process 20 allows for selection of one of the horizons of the seismic survey data to be adjusted.

Figure 4:
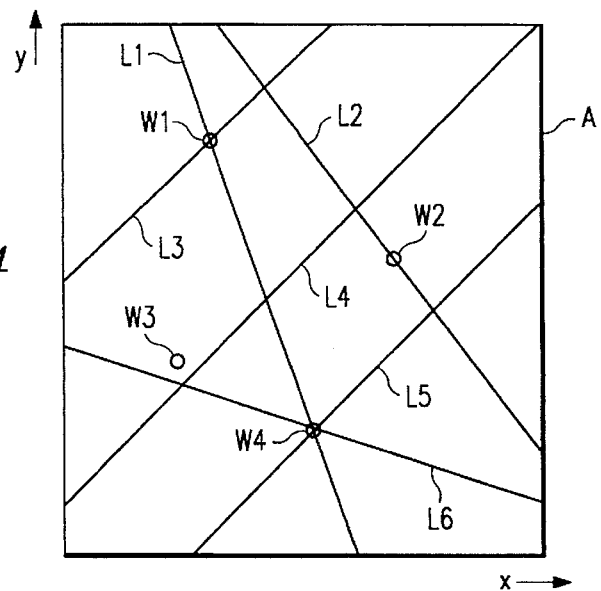
FIG. 4 is an example of a survey display illustrating the locations of survey lines relative to existing logged wells in the survey area.

Process 22 is then next performed in which the well log data retrieved in process 19 is applied, for the selected horizon, to the seismic survey data for that horizon. This posting operation merely correlates the location of the wells, and their interface depth measurement corresponding to the selected horizon, to the coordinate system representing the survey area and the seismic survey data retrieved in process 18. Correlation of the interface depth measurement may require conversion to account for differences in the measurement datum (e.g., depth measured from the kelly bushing versus elevation from sea level). FIG. 4 illustrates an example of a graphics display of survey region A for the selected horizon to which the well log data has been applied in process 22. The view of FIG. 4 corresponds to a plan view of survey region A, and shows that the exemplary seismic survey provided a plurality of shot lines L1 through L6; each of these shot lines is associated with data retrieved in process 18 corresponding to the selected horizon. While shot lines L1 through L6 are shown as lines, in practice these shot lines correspond to a closely spaced series of discrete points, each having x and y coordinates indicating their position in survey region A, and also having a depth value indicating the deduced depth of the horizon at that (x, y) location. Also shown in FIG. 4 are the locations of existing wells W1 through W4 for which well log data has been retrieved for the selected horizon; in the representation of FIG. 4, each of wells W1 through W4 also has x and y coordinates in the spatial domain of survey region A, along with a depth value indicative of the depth of a particular geological interface at that (x, y) location, as observed from the well log.

The representation of FIG. 4 is such as may be displayed by computer system 2 on graphics display 10. It is therefore preferable to utilize color information such that the horizon depth value at each x, y location of lines L1 through L6 may be indicated by a particular color, each color corresponding to a range of horizon depths. The display of FIG. 4 may also present, for each of wells W1 through W4, the depth of the interface S corresponding to the selected horizon, as measured by the well log data; this depth may be merely presented by way of characters on the display of FIG. 4 adjacent the indication of the well location.

As illustrated in FIG. 4, wells W1 through W4 are generally located at or near seismic survey shot lines L1 through L6. Such correspondence of well locations to shot lines is typical, as the drilling operator is most likely to drill a well at a location for which as much information as possible has been obtained. However, as will be indicated below, the preferred embodiment of the invention does not require well locations to be collinear with survey shot lines.

After application of the well log data into the coordinate system of the seismic survey data, process 24 is then performed to determine, for each well location, the deviation between the horizon depth deduced from the seismic survey and the actual measured interface depth at the well location. For wells located at seismic survey shot points, the determination of process 24 is simply a subtraction. For well locations that are not at a shot point, such as well W3, interpolation of the horizon depth from neighboring shot lines is preferably performed to calculate a horizon depth at the well location, so that the deviation may then be performed by a simple subtraction. It is contemplated that computer system 2 may allow interactive input from a human user so that the interpolation may be performed in an intelligent manner; for example, the human user may select particular shot lines from which to perform the interpolation, or alternatively a distance from the well may be selected, within which seismic results are available for the interpolation. As a result of process 24, computer system 2 preferably generates a table for the selected horizon, in which each well location W will have a deviation value assigned thereto. The deviation value will, of course, be a signed value, indicating whether the survey horizon depth is above or below the measured interface depth.

Preferably, computer system 2 displays a table of the deviation values for all of the wells in survey region A, prior to continuing the process. This allows a human user to edit out certain wells that have extraordinarily high deviations, such as may have been caused by data entry errors of the well log data or another anomaly; erroneous readings are thus prevented from unduly affecting the adjustment process.

Once the deviations at the well locations W are determined in process 24, the seismic survey horizon depth may then be adjusted at a selected point in the survey region. According to this embodiment of the invention, the selected point may be a single point along a shot line at which a new well is proposed to be drilled; alternatively, each of the discrete points in each shot line of the seismic survey may be adjusted, so that the overall seismic survey is improved to correspond to well log measurements.

In process 26, a difference function is determined for the selected survey point of interest, based upon the deviations calculated for each of the well locations in process 24, and also based upon the distance between the survey point of interest and the well locations. This difference function is then applied to the horizon depth value for the survey point of interest, to result in an adjusted depth value of improved accuracy.

Figure 5:
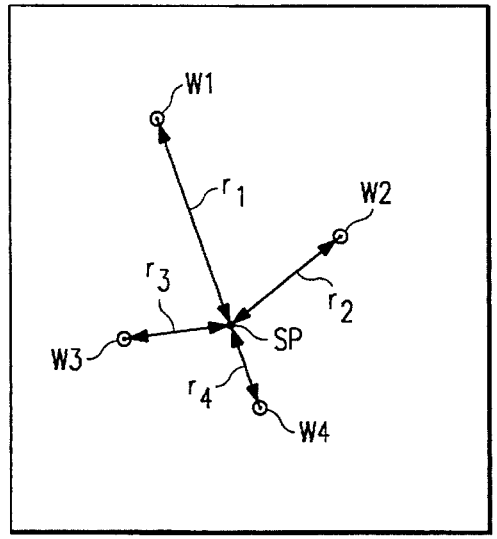
FIG. 5 is a simplified plot of a survey region containing a point at which adjustment is being performed according to the preferred embodiment of the invention.

For example, attention is directed to FIG. 5 in which the horizon depth value of survey point of interest SP is to be adjusted based upon the deviations determined for well locations W1 through W4. Survey point SP is preferably a point on one of the shot lines of the survey; in the example of FIG. 5, it is a point on line L1. Well locations W1 through W4 are at radial distances $r_1$ through $r_4$, respectively, from survey point SP.

According to the preferred embodiment of the invention, the difference function to be applied to the horizon depth at survey point SP is a weighted average of the deviations for each of well locations W1 through W4. In this example, the weighting is according to the inverse square of the radial distance r between the well location W and the survey point SP. Accordingly, the adjustment value ADJ is defined in this example as follows:

$$ADJ = \frac{1}{n} \sum_{i=1}^{n} \frac{d_i}{r_i^2}$$

where $d_i$ is the deviation calculated in process 24 for well $W_i$, where $r_i$ is the radial distance between survey point SP and well $W_i$, and where n is the total number of wells W in survey region A that are to be used in adjustment process 26 for the selected horizon.

Of course, other difference functions may be used to adjust the horizon depth at survey point SP. For example, if well locations W are not substantially uniformly spaced over survey region A, some type of sub-area averaging or the like may be used to keep a number of wells in one small area from disproportionately affecting the adjustment value ADJ. Alternatively, a human user of computer system 2 may interactively select those wells to be used in the adjustment process by location, to avoid such loading of the adjustment.

Upon adjustment of the survey point of interest in process 26, decision 27 determines if additional survey points are to be also be similarly adjusted. While adjustment may be done only at a single point in the survey region, for example at the location of a proposed well, it is contemplated that adjustment of the horizon depths will generally be done for all survey points in the survey region, since the computations required in this process may be rapidly performed by modern computing equipment. Further in the alternative, the human user of computer system 2 may select only specific shot line or lines for adjustment according to the present invention. Selection of the number of survey points to be adjusted according to the preferred embodiment of the invention is preferably made by a human user of computer system 2 by way of program commands (e.g., a batch operation), or interactive inputs via keyboard 6 or mouse 8. In any case, if decision 27 determines that additional survey points are still to be adjusted, process 26 is repeated.

Upon completion of the adjustment of process 26 for all of the desired survey points, control passes to process 30 for evaluation of an error statistic relative to the adjustment process. It is contemplated that the error statistic evaluated by process 30 for the selected horizon will primarily be used as a degree-of-goodness indicator, allowing the human analyst to have a sense of the accuracy of the seismic survey to the actual geology. However, it is also contemplated that an excessively high error statistic value may provoke the human analyst to edit the seismic survey data or well log data to exclude anomalous values, and to re-run the seismic survey adjustment process for that horizon.

According to this embodiment of the invention, the error statistic is determined by estimating an adjusted horizon depth from the seismic survey at each well location, adjusted using well log data from all other well locations but without reference to the well log data at that well location, and comparing the adjusted horizon depth to the well log data thereat. This process is repeated for each of the well locations in the survey region, and a statistic (e.g., root-mean-square value) calculated therefrom.

Error evaluation process 30 according to this embodiment of the invention will now be described in detail relative to the flow chart of FIG. 6 and the schematic representation of FIG. 7. As shown in FIG. 6, process 34 initializes well location counter i is initialized to begin with a first well in the group of wells within the survey region of interest. For the example of FIGS. 4, 5 and 7 discussed hereinabove, the initial well location is well location W1 within the survey region A.

Process 36 is next performed, by way of which each of the survey points in a survey region appropriate to well $W_i$ is readjusted, using the method of process 26 and decision 27 described hereinabove, but excluding well $W_i$ from the difference function evaluation. The appropriate survey region for which process 36 is performed depends upon whether well location $W_i$ is located away from, or at, a shot line. If well location $W_i$ is located away from a shot line (as is well W3 in FIG. 4), such that the seismic survey value of horizon depth thereat must be determined via interpolation, at least the neighboring portion of the seismic survey region (if not the entire survey region) will be the appropriate survey region for process 36. If the well location $W_i$ is at a shot line, however, only the corresponding survey point at the well location need be adjusted in process 36. Given that the calculation time to readjust the entire survey region is generally quite short on modern data processing systems, however, it may be preferable to merely readjust the entire survey region for each well, regardless of whether or not the well location $W_i$ is at a shot line.

Figure 7:
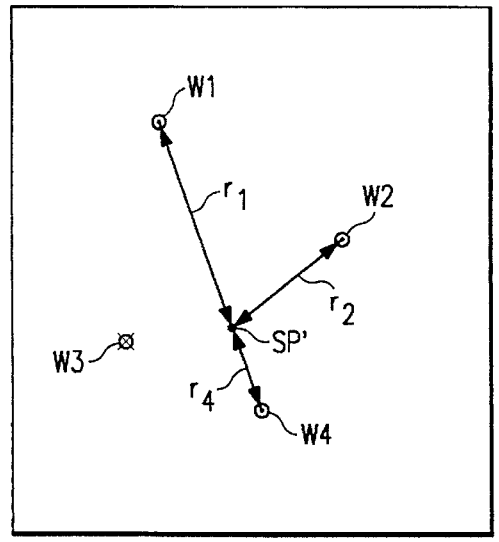
FIG. 7 is a simplified plot of a survey region containing a well location as used in the error evaluation process according to the preferred embodiment of the invention.

FIG. 7 schematically illustrates the readjustment process 36 for a survey point CP', for the case where well W3 of the exemplary survey region A is the excluded well. As illustrated in FIG. 7, only the distances $r_1$, $r_2$, $r_4$, and the respective deviation values $d_1$, $d_2$, $d_4$ are to be used in the adjustment of the horizon depth at survey point SP', where well W3 is the excluded well. Accordingly, the calculation of the adjustment value for survey point SP' is substantially the same as that calculated in process 26 as described above, except that the number of wells W used in determining the weighted average of the deviations is reduced by one. As in the case of process 26, the adjustment value for survey point SP' is then applied to the original horizon depth (i.e., prior to the adjustment of process 26) to generate an adjusted horizon depth thereat. Process 36 is repeated for each of the survey points in the appropriate portion of the survey region for the excluded well $W_i$; as noted above, it may be preferable to repeat process 36 for all of the survey points in the survey region.

Following the adjustment of the horizon depths for each of the appropriate survey points in process 36, process 38 is then performed to produce determine an approximate adjusted horizon depth at the well location $W_i$. As noted above, if well location $W_i$ is at a shot point, and is therefore directly associated with a survey point, process 38 will merely require the retrieval, from memory of computer system 2, of the adjusted horizon depth after process 36. If well location $W_i$ is not at a shot point, however, process 38 will involve interpolation of the adjusted horizon depth from the adjusted horizon depths of survey points on nearby shot lines. Such interpolation is preferably performed in a similar fashion as that performed in process 24 described hereinabove, using the same range of survey points.

Process 40 then determines a value $\Delta_i$ for well location $W_i$, which is the signed difference between the adjusted horizon depth at well location $W_i$ (as determined in process 38) and the well log data value for the actual depth of the corresponding formation interface (as retrieved in process 19). Computer system 2 stores the result $\Delta_i$ in its memory for well location $W_i$, and performs decision 41 to determine if additional well locations W are to be analyzed in process 30.

If so, well location counter i is incremented (process 42), with control passing to process 36 to again readjust survey points in the survey region, with the next well W in sequence excluded (and the prior well W included).

Upon completion of processes 36, 38, 40 for each of the n well locations W, process 44 is then performed to generate an error statistic from the n Δ values. According to this embodiment of the invention, the preferred error statistic is a root-mean-square average of the n Δ values. Of course, other statistics may additionally or alternatively be generated in process 44, as desired by the human analyst. The error statistic thus produced by process 30 will be a measure of the accuracy of the seismic survey, as adjusted by well log data, relative to the well log data for the discrete well locations. If desired, error "bars" may be applied to cross-sectional representations of the horizons of the seismic survey, indicating the accuracy of the corrected surveys to the human analysts.

Referring back to FIG. 3, upon calculation of the error statistic in process 30, decision 31 is performed to see if additional horizons of the seismic velocity survey are to be evaluated and adjusted. As noted above, the selection of horizons is preferably under the interactive control of a human analyst; alternatively, the adjustment may be done in a batch manner, in which case decision 31 would interrogate a counter to see if additional horizons remained. If one or more additional horizons remain, control passes back to process 20, in which the next horizon in sequence is selected, and the process repeated. At such time as no additional horizons are to be analyzed (decision 31 returns a NO), the process of the preferred embodiment of the invention stops.

Of course, the present invention may be applied in alternative ways relative to the description provided hereinabove. For example, depth migration of a subset of the seismic survey may be generated prior to the above adjustment process, and the seismic survey may be adjusted to the depth migration in a similar fashion as adjustment using wells described hereinabove; this migration-based adjusted survey will then be tied to well log data in the manner described hereinabove. Further in the alternative, the error statistic may be evaluated for all horizons at once, rather than for each horizon individually, as described hereinabove.

As a result of the preferred embodiment of the invention, therefore, a seismic survey can be adjusted to have improved accuracy, through tying of the well log data to the survey results not only at or near wells, but also at survey points between and outside of the locations of the wells in the survey region. In this way, tying of the well log data may be done in such a way that the contours of the seismic velocity field between and outside of existing wells is preserved in the seismic survey.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to correlate a seismic survey corresponding to a survey region of the earth to physical measurements from a plurality of well locations of the survey region, comprising the steps of:

retrieving, from computer memory, seismic data representations corresponding to a first horizon in the seismic survey of the survey region, and including horizon depth values for the first horizon at a plurality of survey points in the survey region;

retrieving, from computer memory, data representations of physical depth measurements of a first geological interface corresponding to the first horizon, said physical depth measurements taken at the plurality of well locations of the survey region;

determining, for each well location, a deviation value between the physical depth measurement of the first geological interface and a horizon depth for the first horizon thereat; and for a first one of the plurality of survey points located at a distance from each of the plurality of well locations, adjusting the horizon depth value by a difference value based upon an average of the deviation for each of the plurality of well locations weighted by its distance from the first one of the plurality of survey points.

2. The method of claim 1, wherein the adjusting step is performed for each of the plurality of survey points.

3. The method of claim 2, wherein the plurality of survey points correspond to a seismic shot line in the seismic survey.

4. The method of claim 2, wherein the plurality of survey points correspond to a plurality of seismic shot lines in the seismic survey.

5. The method of claim 1, wherein at least a first one of the plurality of well locations is not located coincident with one of the plurality of survey points.

6. The method of claim 5, further comprising:

determining a horizon depth for the first horizon at the first one of the plurality of well locations, by interpolating from horizon depths at a group of survey points.

7. The method of claim 1, further comprising:

retrieving, from computer memory, seismic data representations corresponding to a second horizon in the seismic survey of the survey region, and including horizon depth values for the second horizon at the plurality of survey points in the survey region;

retrieving, from computer memory, data representations of physical depth measurements of a second geological interface corresponding to the second horizon, said physical depth measurements taken at the plurality of well locations of the survey region;

determining, for each well location, a deviation value between the physical depth measurement of the second geological interface and a horizon depth for the second horizon thereat; and for at least one of the plurality of survey points, adjusting the horizon depth value by a difference value calculated based upon the deviations for each of the plurality of well locations and upon the distance of each of the plurality of well locations from the at least one of the plurality of survey points.

8. The method of claim 1, further comprising:

after the adjusting step, determining an error statistic based upon a comparison of adjusted horizon depths for the first horizon with the physical depth measurements of the first geological interface.

9. The method of claim 8, wherein the adjusting step is performed for each of the plurality of survey points;

and wherein the step of determining an error statistic comprises, for a first one of the plurality of well locations:

readjusting the horizon depth value at each of the plurality of survey points by a difference value calculated based upon the deviations and distance of each of the plurality of well locations except the first one of the plurality of well locations, from each of the plurality of survey points;

after the readjusting step, determining an estimated horizon depth value at the first one of the plurality of well locations; and establishing a difference value between the estimated horizon depth value at the first one of the plurality of well locations and the physical depth measurement of the first geological interface thereat.

10. The method of claim 9, wherein the readjusting, determining and establishing steps are repeated for the plurality of well locations, to establish a plurality of difference values.

11. The method of claim 10, further comprising:

calculating an error statistic based upon the plurality of difference values.

12. The method of claim 11, wherein the error statistic is the root-mean-square of the plurality of difference values.

13. An apparatus for correlating a seismic survey corresponding to a survey region of the earth to physical measurements from a plurality of well locations of the survey region, comprising:

memory, for storing seismic data representations corresponding to a first horizon in the seismic survey of the survey region, and including horizon depth values for the first horizon at a plurality of survey points in the survey region, and for storing data representations of physical depth measurements of a first geological interface corresponding to the first horizon, said physical depth measurements taken at the plurality of well locations of the survey region;

a computer, programmed to perform the steps of:

retrieving, from the memory, the seismic data representations corresponding to the first horizon and the data representations of physical depth measurements of the first geological interface;

determining, for each well location, a deviation value between the physical depth measurement of the first geological interface and a horizon depth for the first horizon. thereat; and for a first one of the plurality of survey points located at a distance from each of the plurality of well locations, adjusting the horizon depth value by an amount based upon an average of the deviation value of each of the plurality of well locations weighted by its distance from the first one of the plurality of survey points; and a display device, coupled to the computer, for displaying the results of the adjusting step.

14. The apparatus of claim 13, wherein the memory is for storing seismic data representations corresponding to a plurality of horizons in the seismic survey of the survey region and for storing data representations of physical depth measurements of a plurality of geological interfaces, each corresponding to one of the plurality of horizons;

and further comprising:

an input device, coupled to the computer and adapted to allow selection of one of the plurality of horizons.

15. The apparatus of claim 13, comprises disk storage.

16. The apparatus of claim 13, wherein the computer is also programmed for, after the adjusting step, determining an error statistic based upon a comparison of adjusted horizon depths for the first horizon with the physical depth measurements of the first geological interface.

17. The apparatus of claim 13, wherein the adjusting step is performed for each of the plurality of survey points.

18. The apparatus of claim 13, wherein at least a first one of the plurality of well locations is not located coincident with one of the plurality of survey points;

and wherein the computer is also programmed for determining a horizon depth for the first horizon at the first one of the plurality of well locations, by interpolating from horizon depths at a group of survey points.

19. The method of claim 1, wherein the average is an arithmetic average of the deviation for each of the plurality of well locations weighted by a weighting factor corresponding to its distance from the first one of the plurality of survey points.

20. The method of claim 19, wherein the weighting factor is the square of the distance of each of the plurality of well locations from the first one of the plurality of survey points.

21. The method of claim 1, wherein the difference value used in the adjusting step is based upon an average of the deviation for each of a selected group of the plurality of well locations weighted by its distance from the first one of the plurality of survey points.

22. The apparatus of claim 13, wherein the average is an arithmetic average of the deviation for each of the plurality of well locations weighted by a weighting factor corresponding to its distance from the first one of the plurality of survey points.

23. The apparatus of claim 22, wherein the weighting factor is the square of the distance of each of the plurality of well locations from the first one of the plurality of survey points.

24. The apparatus of claim 13, wherein the computer adjusts the horizon depth value by an amount based upon an average of the deviation for each of a selected group of the plurality of well locations weighted by its distance from the first one of the plurality of survey points.

* * * * *